(12) United States Patent
Eldridge et al.

(10) Patent No.: US 6,487,189 B1
(45) Date of Patent: Nov. 26, 2002

(54) MOBILE E-MAIL DOCUMENT TRANSACTION SERVICE

(75) Inventors: Margery A. Eldridge, Great Shelford (GB); Michael J. Flynn, Milton (GB); Christopher M. Jones, Trumpington (GB); Michiel F. E. Kleyn, London (GB); Michael G. Lamming, Cambridge (GB); David L. Pendlebury, Wigan Lancs (GB); Anish Shah, Herts (GB)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/270,451

(22) Filed: Mar. 16, 1999

(30) Foreign Application Priority Data

Sep. 30, 1998 (GB) .............................................. 9821103

(51) Int. Cl.[7] .............................................. G06F 15/02
(52) U.S. Cl. ....................................... 370/338; 370/352
(58) Field of Search ................................ 370/338, 352; 707/10; 709/203, 217, 218, 219, 206; 713/201

(56) References Cited

U.S. PATENT DOCUMENTS

| | | | |
|---|---|---|---|
| 5,555,376 A | | 9/1996 | Theimer et al. ........ 395/200.09 |
| 5,826,269 A | * | 10/1998 | Hussey ........................ 707/10 |
| 5,862,321 A | | 1/1999 | Lamming et al. ........ 395/200.3 |

FOREIGN PATENT DOCUMENTS

| | | | | |
|---|---|---|---|---|
| EP | 0 691 619 A2 | * | 10/1996 | ............ G06F/15/02 |
| GB | 2 296 115 A | | 6/1996 | |
| WO | WO 94/12938 | | 6/1994 | |

OTHER PUBLICATIONS

"Comparing Two Approaches to Remote Mailbox Access: IMAP vs. POP", by Terry Gray, revised Sep. 18, 1995, available at http://www.imap.org/papers/imap.vs.pop.brief.html.*

Schilit, Bill et al., "Context–Aware Computing Applications", published in *Proceedings Workshop on Mobile Computing Systems and Applications*, IEEE, Dec. 1994, and in Technical Report CSL–94–12, Xerox Palo Alto Research Center, Nov. 1994.

U.S. patent application Ser. No. 09/118,322 entitled "Token–Based Document Transactions" to Margery A. Eldridge et al., filed on Jul. 17, 1998.

Want, Roy et al., "The Parctab Ubiquitous Computing Experiment," published in Technical Report CSL–95–1, Xerox Palo Alto Research Center, Mar. 1995 and in IEEE Personal Communications, Dec. 1995.

* cited by examiner

*Primary Examiner*—Salvatore Cangialosi (57) ABSTRACT

A system is presented for transmitting document references or tokens to users of integrated wireless and wire-based communication services. The system includes workstations, files servers, printers and other devices coupled to a wire-based network. Mobile computing devices are coupled to the wire-based network through either IR (infrared) or RF (radio) transceiver gateways. Each mobile computing device appears to hold a uses personal collection of documents: the device is programmed to receive, transmit, and store document tokens. A document services request available to users of the mobile computing devices is an email-to-token service. Using this service, document tokens are emailed to recipients with an email account. The transmission protocol for performing the email-to-token service includes the step of transmitting a token-to-email service request from the mobile computing device over the wireless communication service to a token-enabled server located on the wire-based network. The token-enabled server accepts a document token and retrieves from a file server on the wire-based network a document identified by the document token. Subsequently, the token-enabled server sends the identified document in an email message to an email address specified by the user.

20 Claims, 6 Drawing Sheets

MOBILE E-MAIL DOCUMENT TRANSACTION SERVICE

CROSS-REFERENCE TO RELATED APPLICATIONS

Cross-reference is made to U.S. Pat. Nos. 6,421,716, entitled "System For Generating Context-Sensitive Hierarchically Ordered Document Service Menus", 6,397,261, entitled "Secure Token-Based Document Server", and 6,430,601, entitled "Mobile Document Paging Service", which are all assigned to the same assignee as the present invention and hereby Incorporated by reference.

BACKGROUND OF THE INVENTION

1. Field of the Invention

The present invention relates generally to a communication protocol operating between a mobile computing device and a network of document services, and more particularly, to a protocol for performing a token-based document transaction that is adapted to deliver documents to email recipients from mobile computing devices that store document tokens.

2. Description of Related Art

While the use of mobile computing devices is becoming more prevalent among mobile workers, transfer of document information between mobile computing devices is often limited due to inadequate storage capacity on such devices or due to inadequate communication channel bandwidth. To overcome these limitations, many mobile workers carry a laptop computer with them while traveling. Although laptop computers are increasingly smaller and lighter, their functionality, which is designed to meet the requirements of office-based document work, is determined largely by the desktop machines from which they evolved. Powerful editors and spreadsheet applications, for example, that are essential in certain office-based work environments have limited utility while away from the office. In some circumstances, mobile workers carry laptop computers simply to be able to access their documents, and not necessarily to create or edit them.

One mobile document transaction service for overcoming these limitations is disclosed in U.S. Pat. No. 5,862,321 (published in European Patent Application EP 691,619 A2). More specifically, U.S. Pat. No. 5,862,321 (entitled: "System and Method for Accessing and Distributing Electronic Documents") discloses a system for transferring between computers document identifiers that represent a particular document, rather than the document itself. This system can include any number of workstations, file servers, printers and other fixed devices (including multifunction devices) coupled to a network, as well as a number of mobile computing devices carried by users and coupled to the network by an Infrared (IR) or radio (RF) link. Each mobile computing device appears to hold a user's personal collection of documents, with the devices being programmed to receive, transmit, and store document identifiers (e.g., a URL—"Uniform Resource Locator") or document tokens, as defined herein. receive, transmit, and store document identifiers (e.g., a URL—"Uniform Resource Locator") or document tokens, as defined herein.

Each document token is associated with an electronic document stored in an electronic repository or database. The mobile document transaction service effectively distributes references to documents between mobile computing devices by transmission of document tokens, rather than the documents themselves. For example, a document can be sent to an IR transceiver equipped network printer by "beaming" a document token, which references the document, from a handheld portable computer to the network printer. The network printer retrieves the complete document referenced by the document token, and immediately prints a copy of the document. Thus, to a user of the mobile document transaction service, documents are seamlessly passed between users and output or input to devices coupled to networks as expansive as the Internet.

Advantageously, token based document references can be passed between two mobile computing devices without having to transmit large amounts of data. Since the document references are small and defined, the documents that they reference can have an arbitrary size and not impact the performance of the mobile computing devices. Although many devices may be equipped to transmit, receive, and manage document tokens (i.e., token-enabled devices), many computer users may not have their systems equipped with such functionality. Accordingly, it would be advantageous to provide a token-based document transaction service for distributing in electronic form documents identified by a token to computer users not operating token-enabled devices.

SUMMARY OF THE INVENTION

In accordance with the invention there is provided a method and apparatus therefor, for operating a token-enabled server. The token-enable server communicates with a mobile computing device having a repository of document references. Each document reference in the repository of document references identifies a document and a computing device on which the document is stored. A list of available document transaction services is presented on a display of the mobile computing device. One of the available document transaction services, displayed on the mobile computing device, specifies a token-to-email service. From the user at the mobile computing device, a request is received to apply the token-to-email service to a document reference selected from the repository of document references and an email address specified by the user. In response to receiving a request to apply the token-to-email service to the selected document reference and the email address, the token-to-email service request is transmitted from the mobile computing device over a wireless communication system to a token-enabled server. The token-enabled server is coupled to a network and communicates with an email system of the user. If necessary, the token-enabled server retrieves a document identified by the document reference. Subsequently, the token-enabled server sends, with the email system of the user, the identified document or document reference in an email message to the email address specified by the user.

BRIEF DESCRIPTION OF THE DRAWINGS

These and other aspects of the invention will become apparent from the following description read in conjunction with the accompanying drawings wherein the same reference numerals have been applied to like parts and in which.

DETAILED DESCRIPTION

A. Operating Environment

Figure 1:
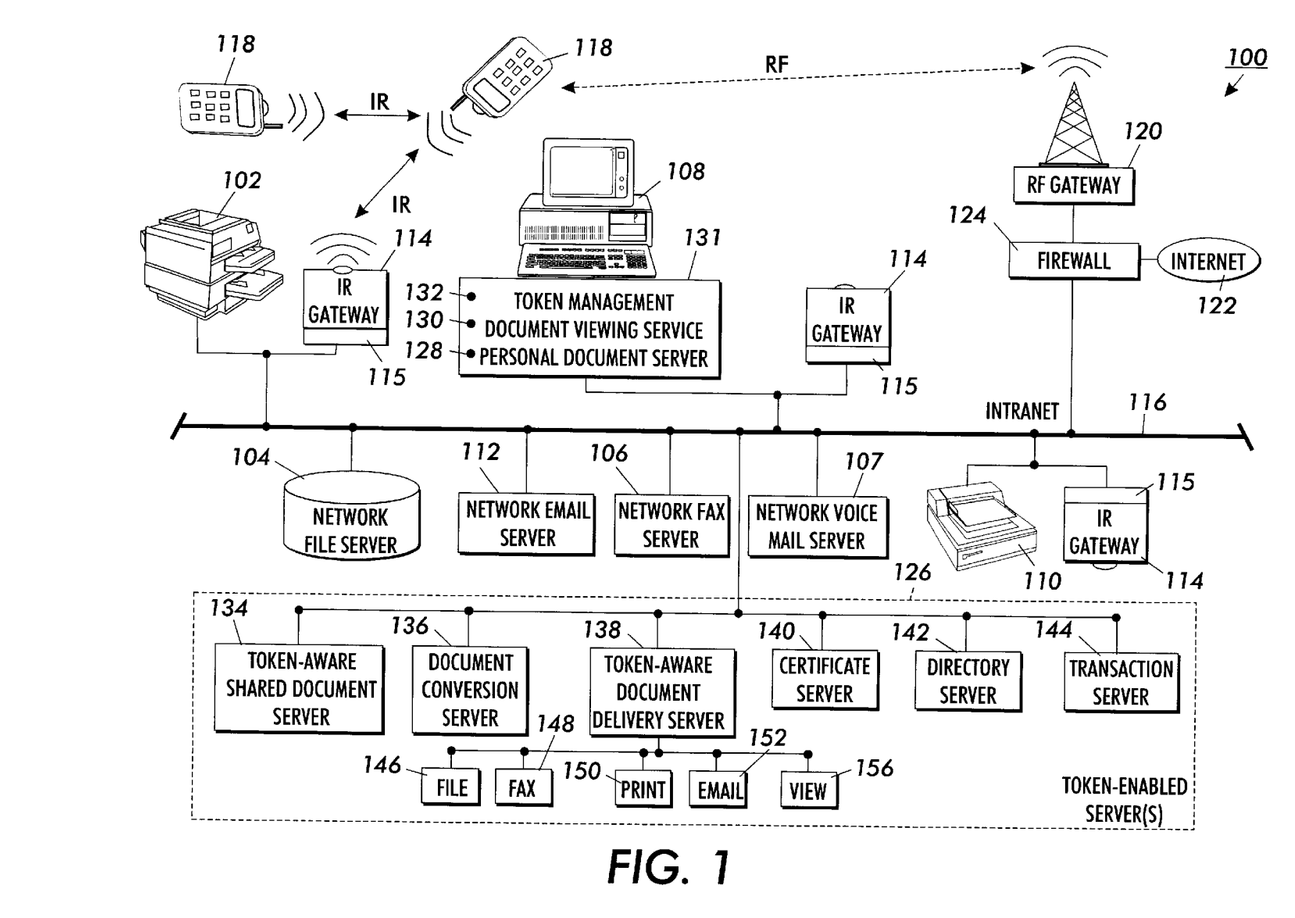
FIG. 1 illustrates a distributed operating environment for performing the present invention.

Referring now to the drawings where the showings are for the purpose of describing the invention, FIG. 1 illustrates a distributed operating environment 100 for performing the present invention. The distributed operating environment includes a plurality of network devices for providing document services. The network devices, which are coupled to wire-based networks 116 and 122, include a printer 102, a file server 104, a network fax server 106, a personal workstation 108, a network voice mail server 107, a scanner 110, and a network email server 112. Generally, these as well as other network devices not shown, communicate using Intranet 116 and gain access to Internet 122 through firewall 124. The network devices communicate over the wire-based networks 116 and 122 using well-known network communication protocols such as TCP/IP.

In addition, FIG. 1 shows mobile computing devices 118. The mobile computing devices 118 are bridged to the wire-based networks 116 and 122 through either IR gateways 114 or RF gateway 120. Such mobile computing devices communicate with each other or other wire-based or wireless devices using either an IR (Infrared) or a radio (RF) transceiver. An example of such a mobile computing device is the Nokia© 9000 Communicator, which is sold by the Nokia Company. The RF transceiver operates over any suitable wireless network such as PCS, GSM, or pager messaging. The IR transceiver uses, for example, communication standards set by the infrared data association (IRDA).

To seamlessly integrate document services across wireless and wire-based networks, the wire-based network is further populated with token-enabled server(s) 126, personal token-enabled workstation elements 131, and IR gateway context insertion slivers 115. These elements operate together in the distributed operating environment to provide users of the mobile computing device 118 with streamlined access to document services available on wire-based networks 116 and 122. Users of token-enabled mobile computing devices 118 are capable of browsing through directories of document tokens. These document tokens represent a user's documents stored on wired-based networks 116 or 122. In addition using token-enabled mobile computing devices, the user is able to apply document services available on networks 116 or 122 to selected document tokens.

Token-enabled mobile computing devices are further described in the following patent applications, which are hereby incorporated by reference: U.S. patent application Ser. No. 08/493,376 (entitled: "System and Method for Accessing and Distributing Electronic Documents"), U.S. patent application Ser. No. 09/118,598 (entitled: "Context-Sensitive Document Transactions"), U.S. patent application Ser. No. 09/118,322 (entitled: "Token-Based Document Transactions") and U.S. patent application Ser. No. 09/118,221 (entitled: "Token-Based Document Transaction Systems"). In addition, further background information relating to network protocols is disclosed by Tanenbaum in "Computer Networks," ISBN 0-13-349945-6.

B. Token-Enabled Server

The token-enabled server 126, which operates on the wire-based networks 116 and 122, communicates with network devices indicated by reference numbers 102, 104, 106, 107, 108, 110, and 112, as well as, the RF and IR gateways 114 and 120. The token-enabled server 126 includes token-aware services or servers 134, 136,138, 140, 142, and 144. These token-aware services can either be operating centrally on token-enabled server 126 or individually on servers distributed over Intranet 116 or Internet 122. The services provided by the token-enabled server(s) 126 are shared between a plurality of users of the mobile computing devices 118.

Transmissions from the mobile computing device 118 are routed through one of the gateways 114 or 120 to transaction server 144. The transaction server 144 is adapted to manage transaction requests from mobile computing devices 118 that involve requests for document services available on networks 116 and 122. The directory server 142 maintains a database of token-enabled devices (e.g., printer 102 and scanner 110). The transaction server 144 communicates with the directory server 142 to look up parameters for satisfying document delivery requests from the mobile computing devices 118. For example, the directory server contains information that relates a particular IR transceiver 114 to its associated network device such as printer 102.

In addition, the transaction server 144 communicates with the token-aware document delivery servers 138 and 128. The token-aware document delivery servers 138 and 128 accept document tokens and retrieve the document that the token represents. Document tokens reference documents stored on the token-aware shared document server 134, the token-aware personal document server 128, or other file servers located on the Intranet 116 and the Internet 122 (e.g., network file server 104). Effectively, any mobile computing device 118 can communicate either directly or indirectly with the token-aware document servers 134 and 128.

One purpose of the token-aware document servers 134 and 128 is to function as an interface between token-enabled devices and services and non-token enabled file servers. That is, the token-aware document servers 134 and 128 are used to access a document identified in a document token when that document is stored on a file server that is not token-enabled. Examples of file services that are not token enabled include the Windows NT file service (a product of Microsoft Corporation) and the NFS (Network File System) file service.

A document token (also referred to herein as document references) is a superset of a Uniform Resource Locator (URL) because document tokens include security elements for authentication. Advantageously, document tokens may also reference documents on any standard web server operating on Intranet 116 or Internet 122 it will be appreciated by those skilled in the art, however, that a standard web server does not recognize secure token transactions, and therefore any security elements of tokens are disregarded by the standard web server. An example of a token-aware document server which supports secure token transactions is disclosed in U.S. Pat. No. 6,397,261, entitled "Secure Token-Based Document Server".

If necessary, the token-aware document delivery server 138 requests that the conversion server 136 convert retrieved documents into an appropriate format. The conversion server 136 converts documents between a number of different document formats such as Microsoft Word, Postscript, and bitmap formats. Interchanging documents between various different formats is known as disclosed, for example, in U.S. Pat. No. 5,210,824.

After retrieving and formatting a document referenced by a document token, the token-aware document delivery server 138 delivers the formatted document to a driver or interface for accessing one of the document processing devices located on Intranet 116 (e.g., printer 102 or personal workstation 108). The drivers or interfaces available on the token-aware document delivery server 138 include a filing interface 146, a fax driver 148, a print driver 150, an email interface 152, or a viewing driver 156. In an alternate embodiment (not shown), the token-enabled server 126 includes a document capture server, which stores and allows access to documents received from input devices such as scanner 110 and fax server 106.

The network gateways 114 and 120, the transaction server 144, the token-aware document delivery server 138, and the token-aware document servers 134 and 128 communicate with the certificate server 140 which stores a list of public keys of users. In requesting a public key from the certificate server 140, a requesting token-enabled server submits a hint of a user's public key. In return, the certificate server 140 supplies a certificate, which contains the user's public key as well as a well-known public key that can be used to authenticate the certificate. In addition, the certificate server 140 can support standard certificates such as the X509 certificates from Verisign Incorporated.

The difference between a token-aware shared document server 134 and a token-aware personal document server 128 is that the shared document server 134 is capable of authenticating requests to fetch documents identified in document tokens using many different key pairs. In contrast, the personal document server 128 may only authenticate requests with one or two key pairs, such as a device key from the mobile computing device 118 and the personal workstation 108. Accordingly, the shared document server 134, unlike the personal document server 128, is adapted to accommodate a number of users operating on Intranet 116.

C. Token Elements on Personal Workstations

Operating on personal workstation 108 are token-enabled personal workstation elements 131, which include a document token management service 132, a token-aware document viewing service 130, and a token-aware personal document server 128. Any combination of these elements may operate on one or more personal workstations 108. The token-aware personal document server 128 provides users operating a mobile computing device 118 with access to documents stored on the particular workstation operating on networks 116 or 122. The token-aware document viewing service 130 provides users of mobile computing devices 118 with the capability of beaming document tokens to the personal workstation 108 and viewing the documents referenced by the document tokens. The document token management service 132 provides a facility for creating document tokens for documents stored, for example, on personal workstation 108 or network file server 104.

D. Token-Enabled IR and RF Gateways

The token-enabled server 126 offers a plurality of document services to users of mobile computing devices 118 through either IR gateway 114 or RF gateway 120. When the gateway 114 receives a document transaction service request from a proximately located mobile computing device 118, the IR gateway 114 forwards the request to the transaction server 144 over Intranet 116. The IR gateway can either be embedded in or be intimately associated with a device that offers document services. For example, the printer 102 shown in FIG. 1 is intimately associated with an IR gateway 114.

Before forwarding the document service request, the IR gateway context insertion sliver 115 authenticates the request using the certificate server 140 and appends context information to the request. Document service requests that arrive either from RF gateway 120 or Internet 122 are authenticated at firewall 124. Forming part of the RF gateway 120 is a dialup server for establishing connections between wire-based and wireless networks. Typically, such a dialup server establishes PPP connections with the mobile computing devices 118 and thereby provides a communication link with the token-enabled server 126 operating on network 116.

In order to establish a connection through a particular IR gateway 114, the IR port of the mobile computing device must have an unobstructed path and be within one meter of the IR gateway 114. In one embodiment when making a document service request, a mobile computing device 118 attempts to access an IR gateway 114 before attempting to access the RF gateway 120. When a mobile computing device 118 is unable to establish an IR connection, the mobile computing device 118 attempts to establish an RF connection over RF gateway 120. Thus, a user must consciously position the mobile computing device 118 proximate to an IR gateway in order to establish an IR link; otherwise by default, an RF link is established unless instructed not to by the user of the mobile computing device. To provide feedback to the user, a message of the status of attempted or established IR or RF connections is presented on a user interface of the mobile computing device.

E. Mobile Token-To-Email Document Transaction Service

E.1 Overview

Figure 2:
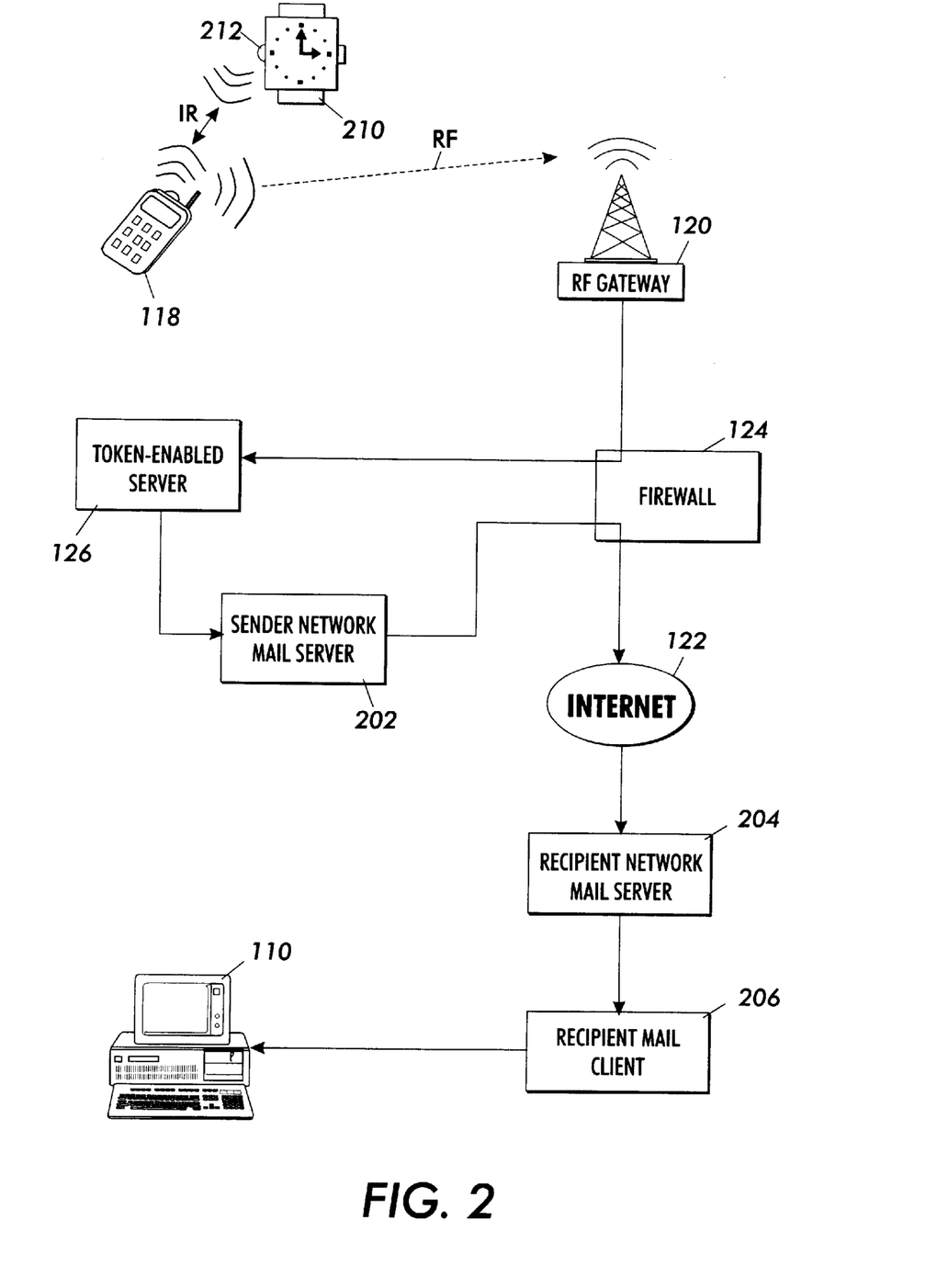
FIG. 2 illustrates the elements of the operating environment shown in FIG. 1 that are used to perform the token-to-email service.
Figure 3:
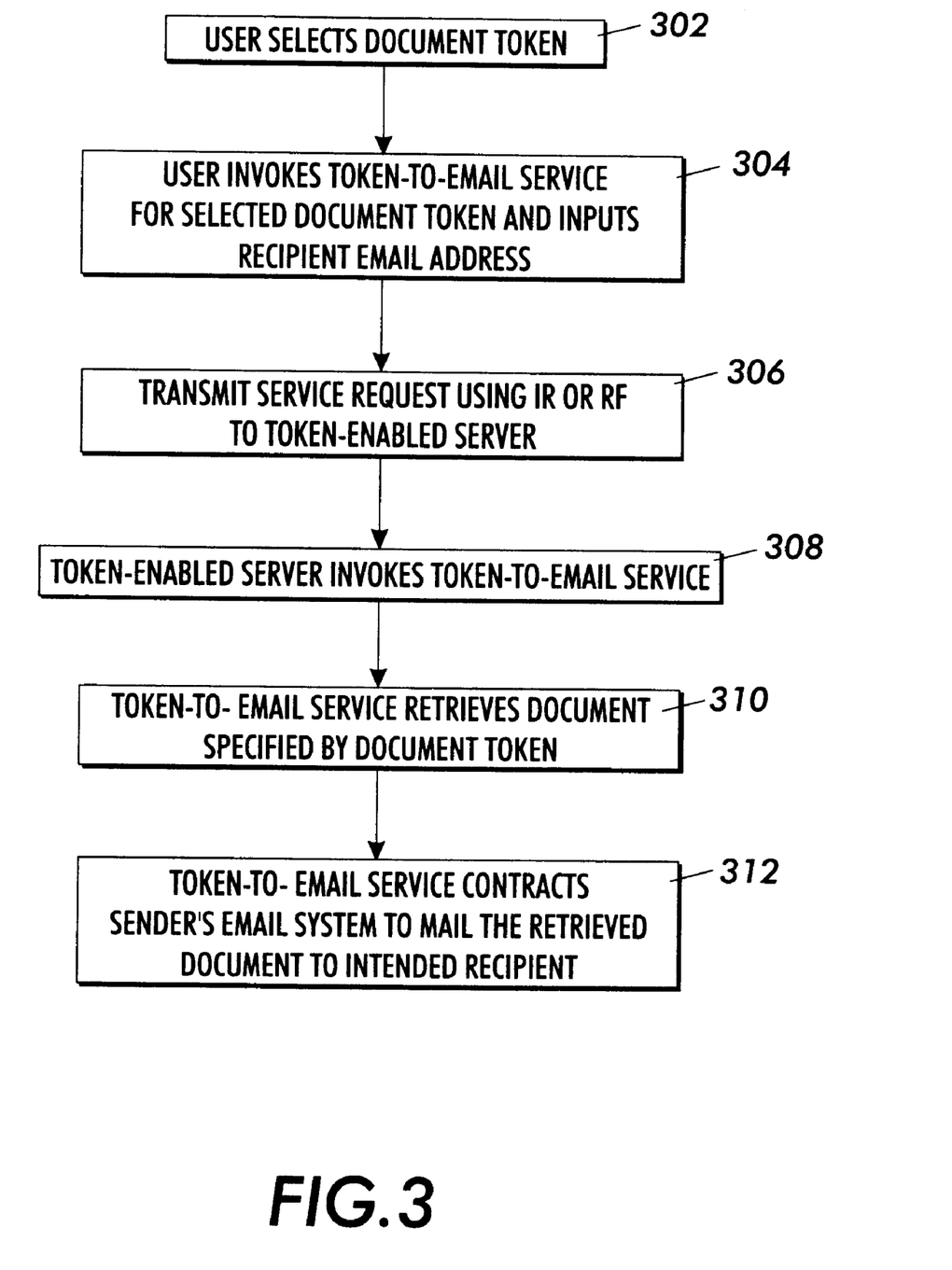
FIG. 3 sets forth the steps performed at the mobile computing device and the token-enabled server for carrying out the token-to-email service.

FIGS. 2 and 3 generally illustrate a process for delivering document tokens in the form of a token or of a document referenced by the token to a recipient's email system. The advantage of the token-to-email service, which is shown generally in FIGS. 2 and 3, is that the recipient of the document referenced by the document token need not be operating a token-enabled enabled device. That is, the recipient user need not have a mobile computing device 118 or be recognized by the token-enabled server 126 to receive document tokens forwarded by users of token-enabled mobile computing devices. More specifically, FIG. 2 illustrates the elements of the operating environment 100 shown in FIG. 1 that are used to perform the token-to-email service, while FIG. 3 sets forth the steps performed at the mobile computing device 118 and the token-enabled server 126.

Initially, at step 302, a user selects a document token using the mobile computing device 118. At step 304, the user invokes the token-to-email service for the document token selected at step 302 and inputs an email address of a recipient. At step 306, the mobile computing device 118 transmits a service request to the token-enabled server 126 using RF gateway 120 (or IR gateway 114) through firewall 124. Upon receipt of the token-to-email request the token-enabled server 126 invokes the token-to-email service, at step 308.

At step 310, the token-to-email service on the token-enabled server 126 retrieves the document specified by the document token selected at set 304. Finally, at step 312, the token-to-email service on the token-enabled server 126 communicates with the email server of the sender 202 to email the retrieved document at step 310 to the intended recipient. Note that step 310 is not performed if the sender of the document token only requests that the token be sent and not the document itself. In response to performing step 312, the emailed message containing the document or document token may pass through firewall 124 onto Internet 122 before being received at the recipient's mail server 204 for later viewing at workstation 110 by the recipient using the recipient's mail client 206.

In an alternate embodiment, instead of inputting the recipient's email address at step 304, the email address is received over a partially enabled mobile computing device 210 through IR transceiver 212. The partially enabled mobile computing device 210 shown in FIG. 2 is a wristwatch. Instead of a wristwatch, the device 210 can alternatively be in the form of a pin, earring, or tie clip. Additional details of such partially enabled mobile computing device is disclosed in UK Patent Application GB 2296115A, entitled "Transferring Data from a Portable Computer."

E.2 Transaction Protocol and User Interface

Figure 4:
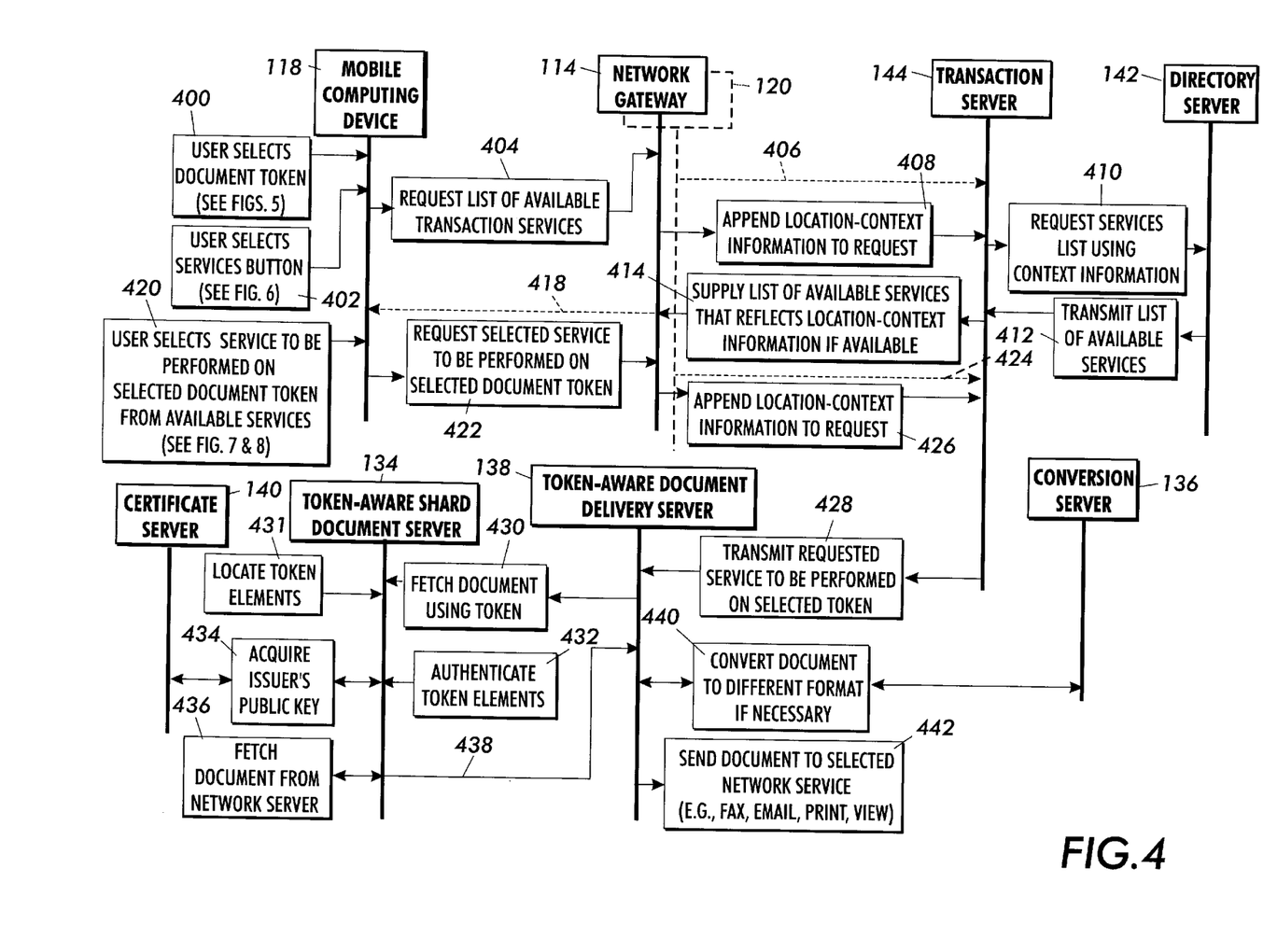
FIG. 4 illustrates a transaction protocol for providing token-to-email service over integrated wireless and wire-based communication networks.

FIG. 4 illustrates a transaction protocol for providing the token-to-email service using an integrated wireless and wire-based communication service. The transaction protocol defines the actions to be performed by the token-enabled servers 126 to provide the token-to-email transaction service that delivers to specified email recipients a document referenced by a document token stored on a mobile computing device. FIGS. 5–8 illustrate a user interface operating on the mobile computing devices 118 for performing user-specified operations set forth in FIG. 4.

Figure 5:
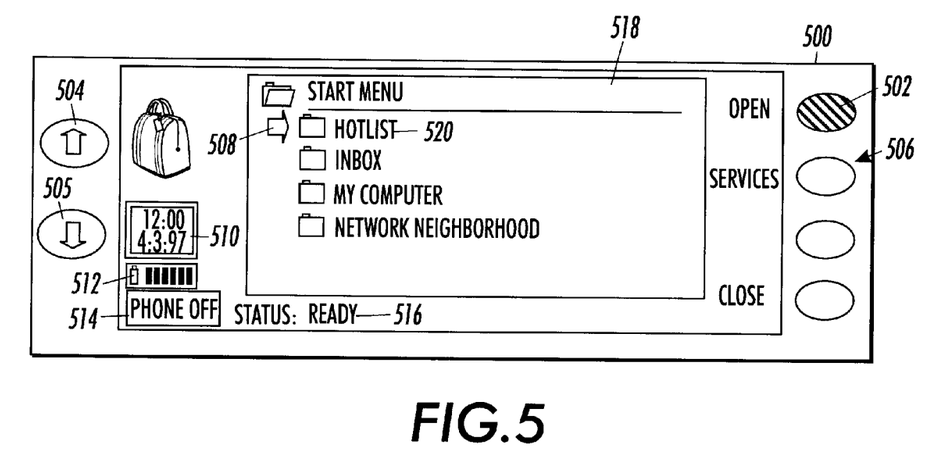
FIGS. 5–8 illustrate a user interface, which operates on a mobile computing device, for performing the user-specified operations of the protocol set forth in FIG. 4.

The transaction protocol for providing the token-to-email service is invoked by a user of the mobile computing device 118 by selecting a document token, as indicated by action 400. The action 400 is performed, for example, on a user interface 500 of the mobile computing device 118. Generally, the user interface 500 includes scroll buttons 504 and 505, command buttons 506, selection indicator 508, time and date indicator 510, battery power indicator 512, field strength indicator 514, and operational status indicator 516.

In one embodiment, the user selects a document token from a "Hotlist" folder 520 which is accessible from the start menu screen 518 shown in FIG. 5. Each document in the "Hotlist" folder is a document token. Only a reference to a document and not the contents of the document are actually stored on the mobile computing device 118. Storing document tokens advantageously minimizes the memory requirements of the mobile computing devices 118, as well as, the bandwidth required for transmitting information from a mobile computing device to other mobile computing devices or other computing devices that are coupled to networks 116 or 122. An example of a document token is a document URL (Uniform Resource Locator) which consists of three fields: a protocol field, a field with the DNS (Domain Name System) name of a host system, and a file name field.

Figure 6:
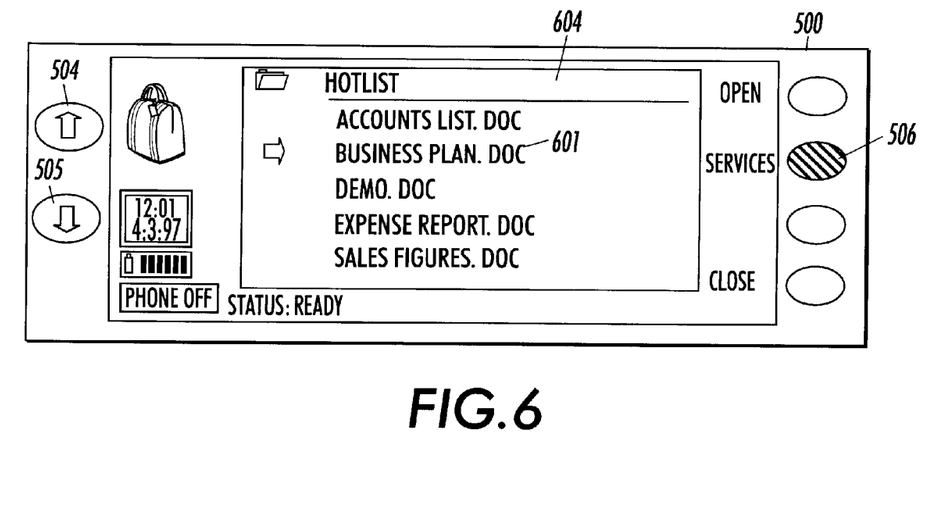

By selecting the "open" command button 502, the contents of the "Hotlist" folder are displayed in the display screen 604 shown in FIG. 6. Although the information for displaying the contents is local to the mobile computing device, the device may automatically or in response to a command re-synch its contents with the contents of the user's personal workstation 108. In one embodiment, the content of the personal workstation of a user is mirrored on the display screen of the mobile computing device. Tokens are implicitly constructed as a mobile computing device browses files and folders accessible via the token-aware document server 126. A mobile computing device implicitly constructs a token by assembling filename, host name, protocol, and security information about a document.

From the display screen 604, the user selects one of the document tokens shown on mobile computing device 118 using scroll buttons 504 or 505. Once selected, the user selects the "Services" button 506 as shown in FIG. 6. Responsive to the action 402 of selecting the services button for a document selected at action 400, mobile computing device 118 transmits a request for a list of available transaction services for that user at action 404, as shown in FIG. 4. The request is transmitted to wire-based networks 116 and 122 through either gateway 114 or 120. In the event the request for available services at action 404 is transmitted through one of the IR gateways 114, a location context is appended by context insertion sliver 115 at action 408; otherwise, no context information is appended to the request for available services at action 404 at the RF gateway 120 as shown in FIG. 4 by arrow 406.

Transmissions from mobile computing devices 118 that are received by either gateway 114 or 120 are transmitted to an available transaction server 144. Upon receipt of a request for available services, the transaction server 144 transmits a request at action 410 using available context Information provided by the directory server 142. Responsive to the request, the directory server 142 provides the transaction server 144 with a list of available document transaction services at action 412. Depending on the context information appended to the request for available services, the directory server 142 adjusts the list of available document transaction services. More details of context sensitive responses to requests for lists of available services are disclosed in U.S. Pat. No. 6,421,716, entitled "System For Generating Context-Sensitive Hierarchically Ordered Document Service Menus". Subsequently, the transaction server 144 transmits to the network gateway 144, at action 414, a list of available services that reflects location-context information if available. Upon receipt, the network gateways 114 and 120 communicate the Information relating to available services to mobile computing device 118 at action 418.

Figure 7:
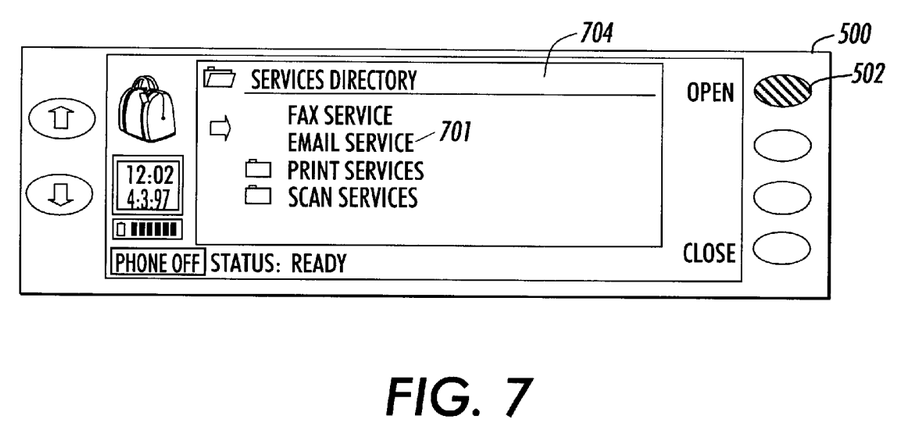
Figure 8:
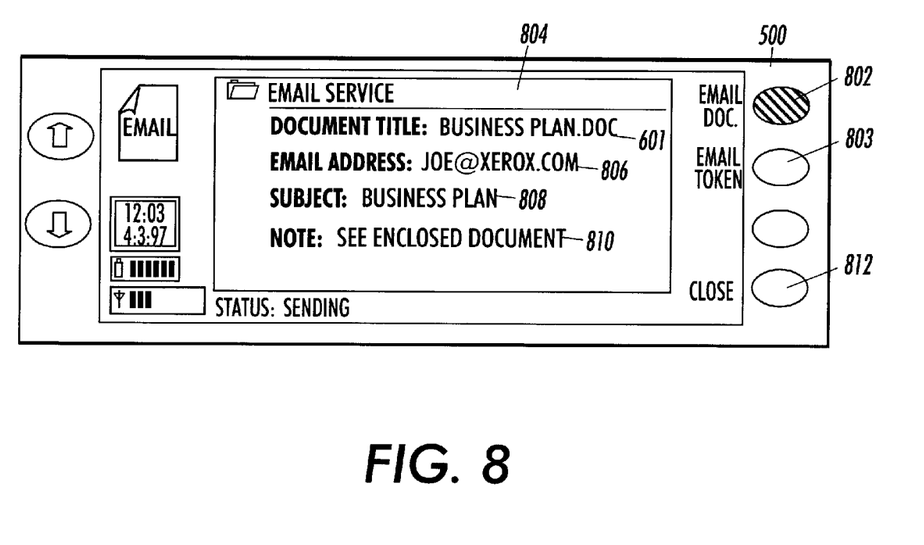

Once a list of available services is received at the mobile computing device 118, the "Services Directory" screen 704 shown in FIG. 7 is presented at user interface 500. After being presented with display screen 704, a user invokes the open command button 502 (shown in FIG. 7) while selecting the email service 701 (or token-to-email service) at user action 420. Responsive to the user action 420, the "Email Service" display screen 804 is presented at the user interface 500 which automatically displays the name of the document token selected at screen 604 shown in FIG. 6, namely the document token indicated by reference number 601. In addition, at action 420, a user is provided with locations on the user interface 500 for filling in one or more recipient email addresses 806, an email subject 808, and a message 810.

Upon filling in some or all of the locations shown on the display screen 804, the user selects the command "email doc." 802 shown in FIG. 8. Alternatively, the user can select the command "email token" 803, or the command "close" 812. The command "close" 812 is used to exit from the token-to-email service. The "email doc." command 802, unlike the "email token" command 803, results in emailing to a specified recipient at location 806, the document identified by a document token 601. In contrast, selecting the "email token" command 803 results in the emailing to the specified recipient the actual document token 601. In the user interface 500 shown in FIG. 8, the user selected the "email doc." command 802. Responsive to selection of either command, mobile computing device 118 returns to either display screens 518 or 604, which are shown in FIGS. 5 and 6 respectively. A user of the mobile computing device 118 can retrieve progress of any document transaction service requested by opening a service request status log (not shown).

At action 422, the mobile computing device 118 transmits the request specified by the user in display screen 804

(shown in FIG. 8). Upon receipt of the service request, the IR network gateway 114 appends location-context information at action 426 (while the RF gateway 120 does not append context information at action 424) before transmitting the received service request to the transaction server 144. Subsequently at action 428, the transaction server 144 transmits the service request for performing the token-to-email service on the selected document token 601 to the token-aware document delivery server 138. At action 430, the token-aware document delivery server 138 requests, when the "email doc." service 802 is selected, that the document identified by the selected document token 601 be fetched from a token-aware document server, which in this example is the token-aware shared document server 134.

Initially at action 431, the token-aware shared document server 134 locates elements of the token received from the token-aware document delivery server 138. The token elements that are located at action 431 include for example a document URL that identifies the name and location of a document. The token-aware shared document server 134 then authenticates document token at action 432. Part of the process of authenticating the document token is performing action 434 for acquiring the public key of the original user issuing the document token. Details for authenticating elements of the token are described in U.S. Pat. No. 6,397,261, entitled "Secure Token-Based Document Server". Although not shown in FIG. 4, authentication of the document token can be performed at network gateways 114 and 120, the transaction server 144, and the token-aware personal document server 128.

After authenticating the token, the token-aware shared document server 134 fetches the document from its physical location on the network file server 104 or the like, at action 436. However, when the "email token" service 803 is selected, action 436 is not performed and no document is fetched from the network. In addition, when using the "email token" service 803, instead of the "email doc." service 802, the recipient's computer must be token-enabled. The fetched document is then forwarded to the token-aware document delivery server 138 at action 438. If necessary, the token-aware document delivery server 138 performs action 440 to convert the document acquired from the token-aware shared document server 134 into a format specified either by the sender or the selected email service using the conversion server 136.

Finally, to complete the actions performed by the token-enabled servers 126 in performing the token-to-email transaction service, the document delivery server 138 sends the document acquired from the token-aware shared document server 134 to the specified email recipient. In addition to the document, any subject data 808 or message data 810 specified by the sender is transmitted using the sender's existing network email server 204. The mail client 152 of the document delivery server 138 communicates with the network email sever 112 using for example the well-known SMTP mail protocol.

F. Summary

It will be appreciated that the present invention may be readily implemented in software using software development environments that provide portable source code that can be used on a variety of hardware platforms. Alternatively, the disclosed system may be implemented partially or fully in hardware using standard logic circuits. Whether software or hardware is used to implement the system varies depending on the speed and efficiency requirements of the system and also the particular function and the particular software or hardware systems and the particular microprocessor or microcomputer systems being utilized.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed Is:

1. A method for operating a token-enabled server that communicates with a mobile computing device, the mobile computing device having a repository of document references, each document reference in the repository of document references identifying a document and a computing device on which the document is stored, the method comprising the steps of:

responding to a request from the mobile computing device for a list of available document transaction services; one of the available document transaction services identified in response to the request including a token-to-email service;

receiving, from the mobile computing device over a wireless communication system, a request to apply the token-to-email service to a document reference selected from the repository of document references and an email address; and responsive to said step of receiving a request to apply the token-to-email service to the selected document reference and the email address, performing the steps of:

retrieving a document identified by the document reference received by said receiving step; and sending the identified document in an email message to the email address received by said receiving step.

2. The method according to claim 1, further comprising the step of authenticating the request to apply the token-to-email service to the selected document reference.

3. The method according to claim 1, wherein said retrieving step further comprises the step of identifying directory information specifying where the document identified by the document reference is stored on a network.

4. The method according to claim 1, further comprising the step of receiving, from a user at the mobile computing device, a mail note to accompany the request to apply the token-to-email service to the selected document.

5. The method according to claim 1, wherein said receiving step is performed using an IR transceiver.

6. The method according to claim 1, wherein said responding step further comprises transmitting over the wireless communication system to the mobile computing device the list of available document transaction services.

7. The method according to claim 6, further comprising the step of appending at a network gateway context information to the request for available services.

8. The method according to claim 7, further comprising the step of adjusting the list of available document transaction services in response to the context information appended to the request for available services.

9. A token-enabled server that communicates with a mobile computing device, the mobile computing device having a repository of document references, each document reference in the repository of document references identifying a document and a computing device on which the document is stored, the token-enabled server comprising:

means for responding to a request from the mobile computing device for a list of available document transaction services: one of the available document transaction services identified in response to the request including a token-to-email service;

means for receiving, from the mobile computing device over a wireless communication system, a request to apply the token-to-email service to a document reference selected from the repository of document references and an email address; and means for responding to said means for receiving a request to apply the token-to-email service to the selected document reference and the email address, said responding means further comprising:
   means for retrieving a document identified by the document reference received by said receiving means; and
   means for sending the identified document in an email message to the email address received by said receiving means.

10. A mobile document transaction service, comprising:
a mobile computing device having a repository of document references and a display; each document reference in the repository of document references identifying a document and a computing device on which the document is stored; the display of the mobile computing device displaying a list of available document transaction services which includes a token-to-email service;
a transceiver for receiving, from a user at said mobile computing device, a request to apply the token-to-email service to a document reference selected from the repository of document references and an email address specified by the user; and
a token-enabled server, coupled to a network and communicating with an email system, for responding to a request to apply the token-to-email service to the selected document reference and the email address; said token-enabled server receiving a token-to-email service request from the mobile computing device over a wireless communication system; wherein said token-enabled server further comprises:
   means for retrieving at the token-enabled server a document identified by the document reference; and
   means for sending, with the email system, the identified document in an email message to the email address specified by the user.

11. The mobile document transaction service according to claim 10, wherein said transceiver is an IR transceiver.

12. The mobile document transaction service according to claim 10, wherein said transceiver is a radio transceiver.

13. The mobile document transaction service according to claim 10, further comprising means for authenticating the request to apply the token-to-email service to the selected document reference.

14. The mobile document transaction service according to claim 10, further comprising means for identifying directory information specifying where the document identified by the document reference is stored on a network.

15. The mobile document transaction service according to claim 10, further comprising means for receiving, from the user operating said mobile computing device, a mail note to accompany the request to apply the token-to-email service to the selected document.

16. The mobile document transaction service according to claim 10, further comprising:
   means for receiving, from said mobile computing device over the wireless communication system, a request for available services; and
   means for responding to requests for available services by transmitting over the wireless communication system to the mobile computing device a list of available document transaction services.

17. The mobile document transaction service according to claim 16, further comprising means for appending at a network gateway context information to the request for available services.

18. The mobile document transaction service according to claim 17, further comprising means for adjusting the list of available document transaction services in response to the context information appended to the request for available services.

19. The mobile document transaction service according to claim 10, wherein the document reference is a universal resource locator (i.e., URL).

20. The mobile document transaction service according to claim 10, wherein the email system is the email system of the user.

* * * * *